US012345503B2

(12) United States Patent
Li et al.

(10) Patent No.: US 12,345,503 B2
(45) Date of Patent: Jul. 1, 2025

(54) AUTOMATIC LIGHT-ADJUSTING STRUCTURE FOR RED DOT SIGHT

(71) Applicant: Syswit Optoelectronics Technology Co., Ltd., Guangzhou (CN)

(72) Inventors: Wenjie Li, Guangzhou (CN); Xi Wang, Guangzhou (CN)

(73) Assignee: Syswit Optoelectronics Technology Co., Ltd., Guangzhou (CN)

( * ) Notice: Subject to any disclaimer, the term of this patent is extended or adjusted under 35 U.S.C. 154(b) by 53 days.

(21) Appl. No.: 18/530,647

(22) Filed: Dec. 6, 2023

(65) Prior Publication Data

US 2025/0085086 A1 Mar. 13, 2025

(30) Foreign Application Priority Data

Sep. 12, 2023 (CN) .......................... 202311174926.8

(51) Int. Cl.
*F41G 1/30* (2006.01)
*G02B 27/20* (2006.01)
*H05B 47/105* (2020.01)

(52) U.S. Cl.
CPC ............... *F41G 1/30* (2013.01); *G02B 27/20* (2013.01); *H05B 47/105* (2020.01)

(58) Field of Classification Search
CPC .................................. F41G 1/30; G02B 27/20
See application file for complete search history.

(56) References Cited

U.S. PATENT DOCUMENTS

| | | | |
|---|---|---|---|
| 2021/0262759 A1* | 8/2021 | Sun | F41G 1/30 |
| 2022/0390207 A1* | 12/2022 | Chavez | F41G 1/01 |
| 2023/0176387 A1* | 6/2023 | Sabaldan Elpedes | H05B 47/11 362/23.19 |
| 2024/0377161 A1* | 11/2024 | Overfelt | F41G 1/345 |
| 2025/0044060 A1* | 2/2025 | Cohen | G02B 23/105 |

* cited by examiner

*Primary Examiner* — J. Woodrow Eldred
(74) *Attorney, Agent, or Firm* — Westbridge IP LLC (57) ABSTRACT

An automatic light-adjusting structure for a red dot sight includes a sight body, a lens frame disposed at the upper part of the sight body, a reflecting lens, a light sensor and a processing unit. The reflecting lens is configured for transmitting target light rays to a receiving end of the light sensor, and the light sensor is configured for detecting the brightness of the target light rays and transmitting brightness data to the processing unit; the processing unit is configured for analyzing the brightness data and adjusting the brightness of a light source in the sight body according to an analysis result. The brightness of the light source (LED) is adjusted according to the brightness of the target light rays, thus achieving the purpose of self-adaptive adjustment, and the optimal visual experience is provided.

7 Claims, 6 Drawing Sheets

Ambient light sensor circuit

Fig. 9

AUTOMATIC LIGHT-ADJUSTING STRUCTURE FOR RED DOT SIGHT

CROSS-REFERENCE TO RELATED APPLICATIONS

This application claims priority to Chinese Patent Application No. 202311174926.8, filed on Sep. 12, 2023, which is incorporated herein by reference in its entirety.

TECHNICAL FIELD

The application relates to the technical field of sights, in particular to an automatic light-adjusting structure for a red dot sight.

BACKGROUND

A red dot sight is an optical sight without magnification, which mainly includes a reflector and a Light-emitting Diode (LED) lamp, the reflector may reflect light rays emitted by the LED lamp, the reflected light rays are always parallel to a target, during observation of human eyes, a sighting dot (generally a red or green dot) is formed on the reflector, and accurate sighting may be carried out through the sighting dot.

A brightness adjustment mode of the sighting dot includes the following two modes.

1. An adjusting button or a knob is disposed on a sight body, the brightness of the sighting point is adjusted through manual operation, however, the mode needs manual operation and adjustment needs to be carried out constantly according to ambient brightness, and redundant electric quantity loss may be caused if the adjustment is not timely.

2. A photosensitive device is disposed beside the LED or in front of a gun sight, the ambient brightness is detected through the photosensitive device, so that the brightness of the LED is adjusted, the surface needs to be milled to form an installation position when the front of the gun sight is subjected to photosensitive treatment, meanwhile, a covering lens is fixed by gluing, so that the installation process is complex, and the cost is high.

SUMMARY

Aiming at the deficiencies in the relevant art, the application provides an automatic light-adjusting structure for a red dot sight.

In order to solve the above-mentioned technical problems, the technical solution adopted by the application is as follows.

An automatic light-adjusting structure for a red dot sight includes a sight body, a lens frame is disposed at the upper part of the sight body, and the structure further includes a reflecting lens, a light sensor and a processing unit.

The reflecting lens is disposed in the lens frame.

The light sensor is disposed at the bottom of the inner side of the lens frame, located in the area, attaching to the lens frame, of the reflecting lens.

The reflecting lens is configured for transmitting target light rays to a receiving end of the light sensor, and the light sensor is configured for detecting the brightness of the target light rays and transmitting brightness data to the processing unit.

The processing unit is configured for analyzing the brightness data and adjusting the brightness of a light source in the sight body according to an analysis result.

Furthermore, the reflecting lens includes a first reflector and a second reflector which are sequentially disposed from front to back, and the first reflector and the second reflector are connected through a gluing layer.

Furthermore, a lens electroplated layer is disposed on the top of the first reflector.

Furthermore, the target light rays are sequentially emitted to the rear surface of the first reflector, the upper surface of the first reflector, the front surface of the first reflector and the receiving end of the light sensor after emitted into the first reflector.

Furthermore, the light sensor is disposed in the lens frame in an embedding manner.

Furthermore, an accommodating groove is formed at the bottom of the inner side of the lens frame, an insulated fixed base is deposed in the accommodating groove, and the light sensor is disposed in the insulated fixed base.

Furthermore, the processing unit is disposed at the bottom of the sight body, a channel communicating the accommodating groove and the processing unit is formed in the sight body, and a signal line connecting the light sensor and the processing unit is disposed in the channel.

With the adoption of the technical solution, compared with the relevant art, the application has the following advantages.

The reflector of the application may reflect target light rays to the receiving end of the light sensor so as to detect the brightness of the target light rays, meanwhile, the brightness of the light source (LED) is adjusted according to the brightness of the target light rays, thus achieving the purpose of self-adaptive adjustment, the optimal visual experience is provided, and that the sighting dot is overlighting in a dim environment or the sighting dot cannot be clearly seen in a bright environment is avoided; the brightness of the light source is adjusted automatically, so that the brightness level may be adjusted according to needs, thus avoiding necessary energy waste.

The light sensor of the application is located in the lens frame, and attaches to the lower surface of the reflecting lens, on one hand, the installation process may be simplified, the cost may be reduced, on the other hand, the influence of external factors on the light sensor, such as rain and dust may be reduced, the stability of the light-adjusting structure may be improved, meanwhile, it is located in the lens frame, thus seldom blocked by external objects, and stable reading of the light sensor is guaranteed.

The application will be described in detail below with reference to drawings and embodiments.

DETAILED DESCRIPTION OF THE EMBODIMENTS

The principle and features of the application will be described below with reference to the drawings, and examples described herein are for the purpose of explaining the application only and are not intended to limit the scope of the application.

In the description of the application, it is to be understood that orientation or position relationships indicated by terms "center", "upper", "lower", "left", "right", "vertical", "horizontal", "inner", "outer", "clockwise", "counterclockwise" and the like are orientation or position relationships shown in the drawings, are adopted not to indicate or imply that indicated devices or components must be in specific orientations or structured and operated in specific orientations but only to conveniently and simply describe the application and thus should not be understood as limits to the application.

Figure 1:
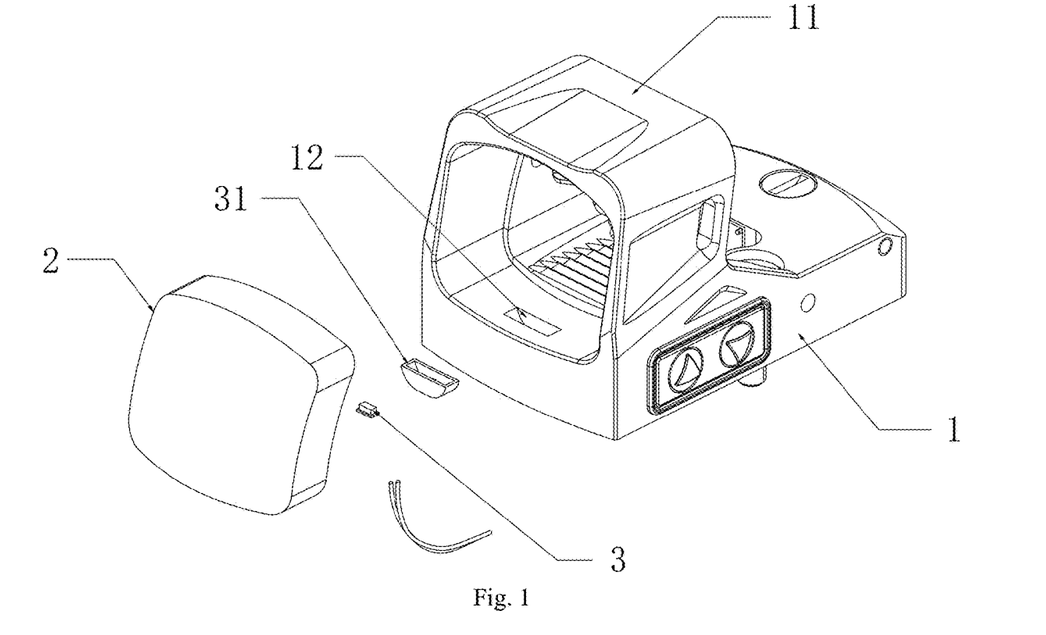
FIG. 1 is a schematic diagram of an exploded view of the application.
Figure 2:
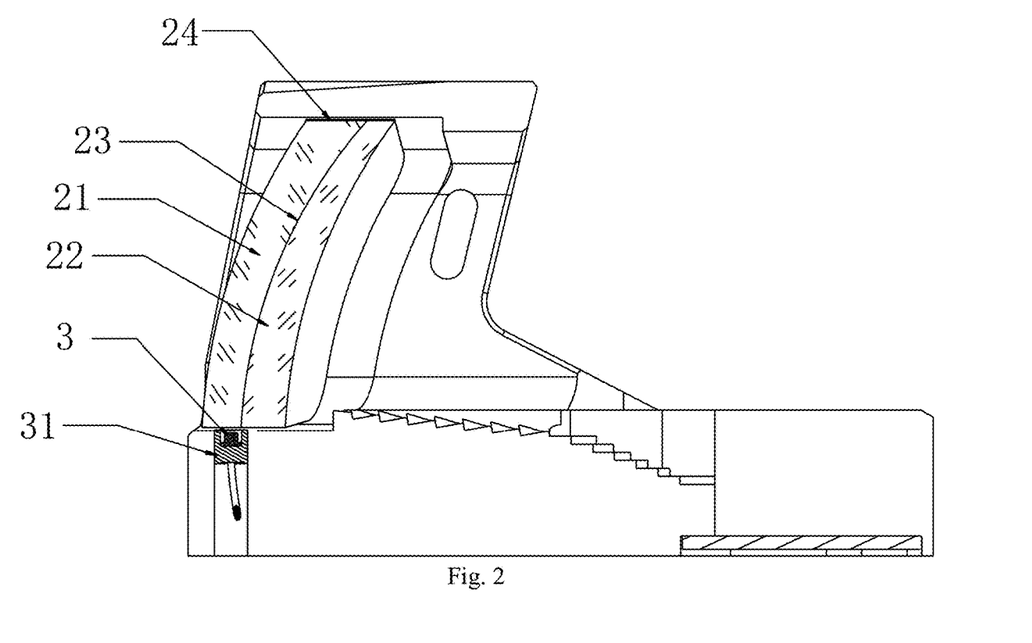
FIG. 2 is a schematic structure diagram of a cross-sectional view of the application.
Figure 3:
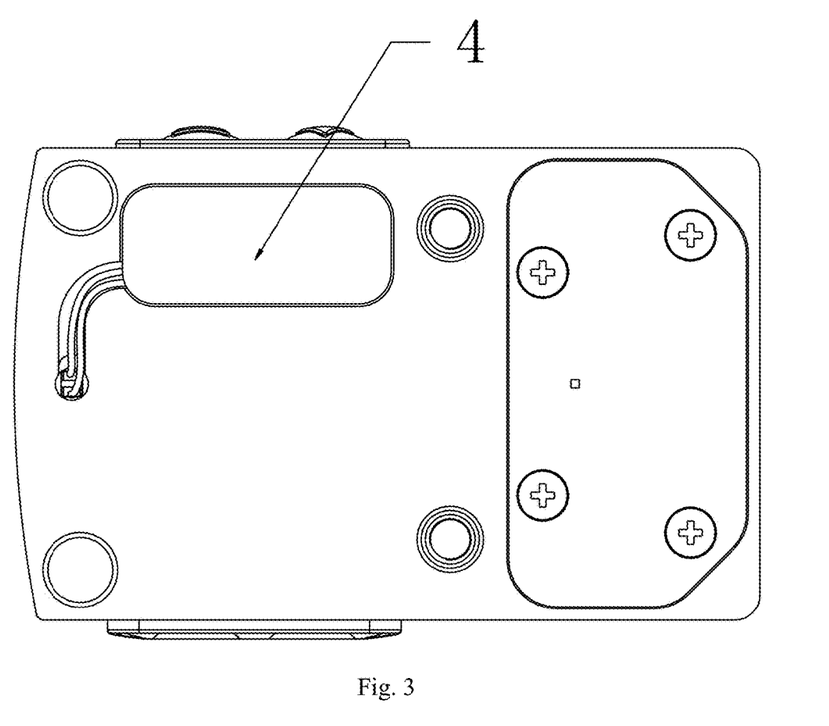
FIG. 3 is a schematic diagram of a bottom view of the application.

As shown in FIGS. 1, 2 and 3, an automatic light-adjusting structure for a red dot sight includes a sight body 1, a lens frame 11 is disposed at the upper part of the sight body 1, and the structure further includes a reflecting lens 2, a light sensor 3 and a processing unit 4.

The reflecting lens 2 is disposed in the lens frame 11.

The light sensor 3 is disposed at the bottom of the inner side of the lens frame 11, located in the area, attaching to the lens frame 11, of the reflecting lens 2.

The reflecting lens 2 is configured for transmitting target light rays to a receiving end of the light sensor 3, and the light sensor 3 is configured for detecting the brightness of the target light rays and transmitting brightness data to the processing unit 4.

The processing unit 4 is configured for analyzing the brightness data and adjusting the brightness of a light source in the sight body 1 according to an analysis result.

Figure 6:
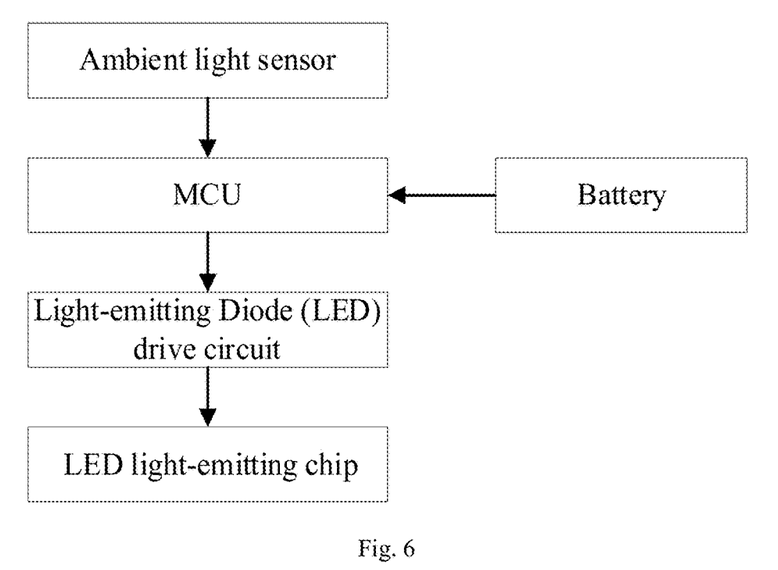
FIG. 6 is a connection schematic diagram of the application.
Figure 7:
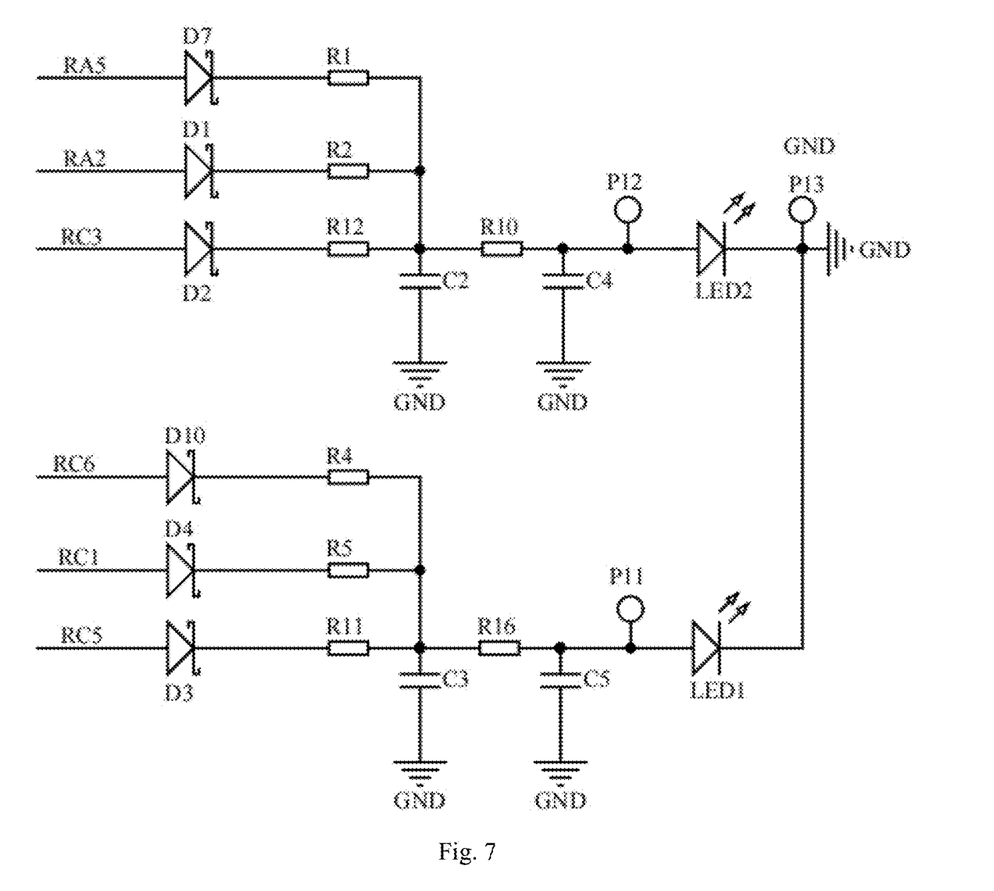
FIG. 7 is a drive circuit diagram of an LED.
Figure 8:
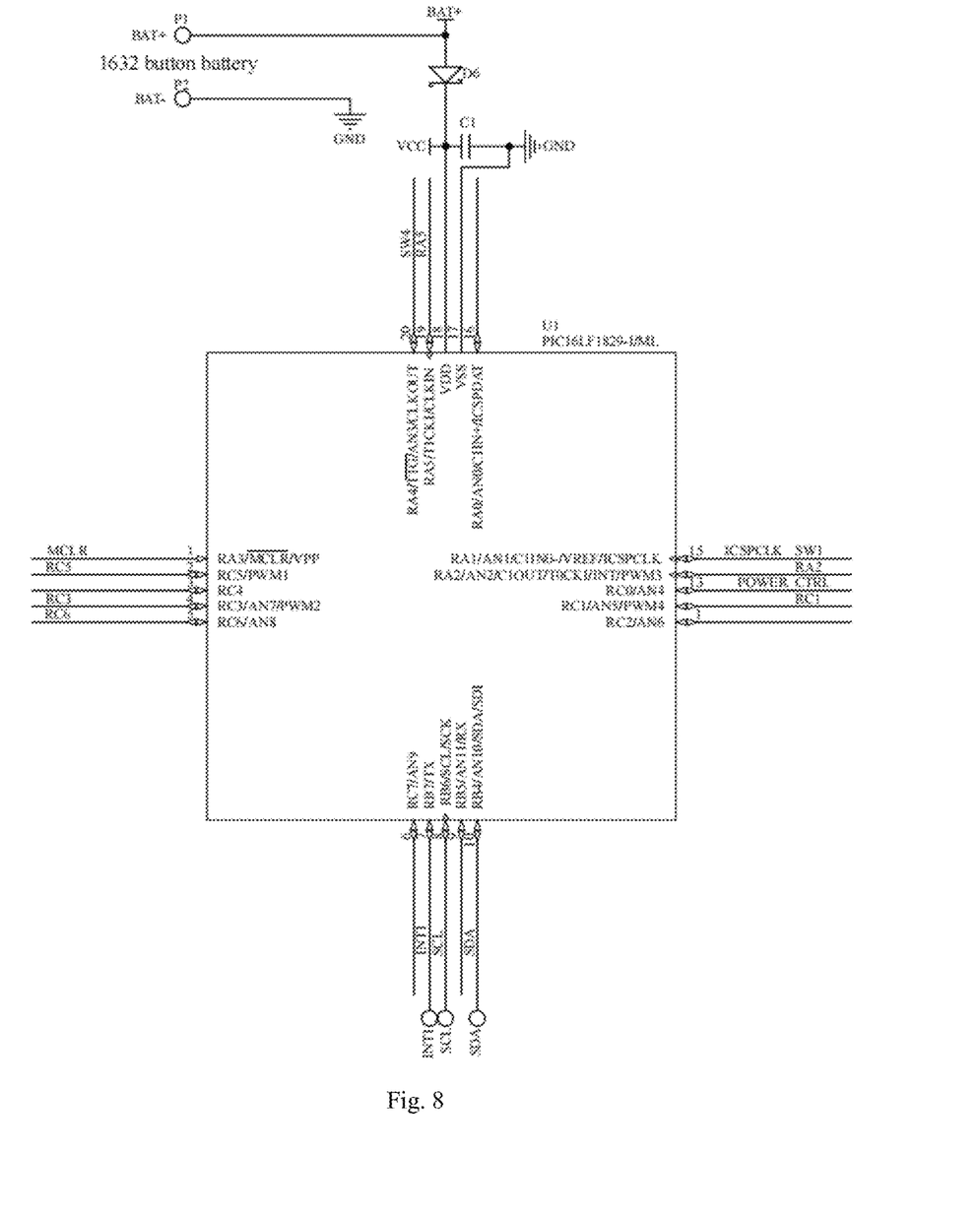
FIG. 8 is a circuit diagram of a Micro Control Unit (MCU).
Figure 9:
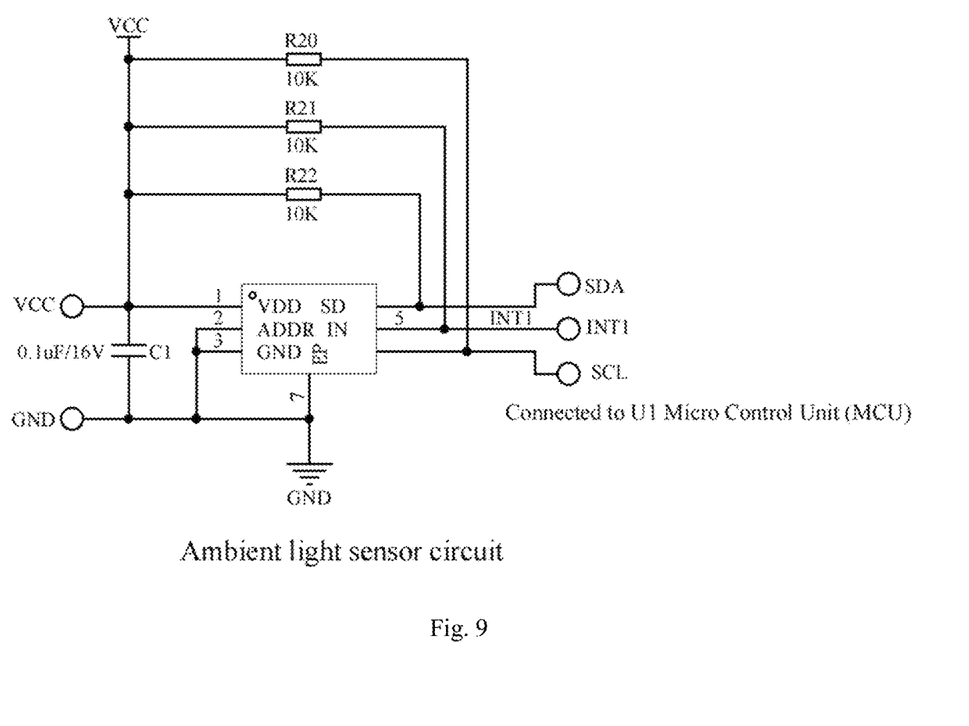
FIG. 9 is a circuit diagram of an ambient light sensor.

Specifically, as shown in FIG. 6, the processing unit 4 includes an MCU and an LED drive circuit, the light sensor 3 is electrically connected with the MCU, the MCU is electrically connected with the LED through the LED drive circuit, a power supply is electrically connected with the MCU, and the specific circuit structure diagram is as shown in FIGS. 7, 8 and 9.

An ambient light sensor circuit is disposed in the light sensor 3, and manly configured for transmitting brightness data of the target rays to the MCU, the ambient light sensor circuit in the embodiment of the application includes a chip U2, a resistor R20, a resistor R21, a resistor R22 and a capacitor C1, a pin 1 of chip U2 is connected with one end of the capacitor C1, which are connected to a power supply VCC together, a pin 2, a pin 3 and a pin 7 of the chip U2 are connected to the other end of capacitor C1 and grounded, a pin 4 of the chip U2 is connected to one end of the resistor R20, a pin 5 of the chip U2 is connected to one end of the resistor R21, a pin 6 of the chip U2 is connected to one end of the resistor R22, and the other end of the resistor R20, the other end of the resistor R21 and the other end of the resistor R22 are connected to the power supply VCC together.

The LED drive circuit is configured to control the magnitude of current flowing through a LED lamp bead to change the luminous brightness of the LED, and at the same time to complete matching of voltage and current of the LED to ensure normal operation of the LED. The LED drive circuit in the embodiment of the application includes a diode D1, a diode D2, a diode D3, a diode D4, a diode D7, a diode D10, a resistor R1, a resistor R2, a resistor R4, a resistor R5, a resistor R10, a resistor R11, a resistor R12, a resistor R16, a capacitor C2, a capacitor C3, a capacitor C4, a capacitor C5, an LED 1 and an LED 2. The negative electrode of the diode D7 is connected to one end of the resistor R1, the negative electrode of the diode D1 is connected to one end of the resistor R2, the negative electrode of the diode D2 is connected to one end of the resistor R12, the other end of the resistor R1, the other end of the resistor R2 and the other end of the resistor R12 are connected to one end of capacitor C2 together and connected to one end of the resistor R10 together, the other end of the capacitor C2 is grounded, the other end of the resistor R10 is connected to one end of the capacitor C4, which are connected to the positive electrode of the LED 2 together, the other end of the capacitor C4 is grounded, and the negative electrode of the LED 2 is grounded; the negative electrode of the diode D10 is connected to one end of the resistor R4, the negative electrode of the diode D4 is connected to one end of the resistor R5, the negative electrode of the diode D3 is connected to one end of the resistor R11, the other end of the resistor R4, the other end of the resistor R5 and the other end of the resistor R11 are connected to one end of capacitor C3 together and connected to one end of the resistor R16, the other end of the capacitor C3 is grounded, the other end of the resistor R16 is connected to one end of the capacitor C5 and connected to the positive electrode of the LED 1, the other end of the capacitor C5 is grounded, and the negative electrode of the LED 1 is connected to the negative electrode of the LED 2 and grounded.

The chip U1 of the MCU adopts a PIC16LF1829-I/ML chip, which has the characteristics of low power consumption and high performance, and may meet the functional requirements of the processing unit 4. The pin 1 of the chip U1 is an MCLR pin, which has an external reset function and may serve as an input port for programming and debugging, the pin 2 of the chip U1 is connected to the positive electrode of the diode D3, the pin 4 of the chip U1 is connected to the positive electrode of the diode D2, the pin 5 of the chip U1 is connected to the positive electrode of the diode D10, the pin 7 of the chip U1 is connected to the pin 5 of the chip U2, the pin 8 of the chip U1 is connected to the pin 4 of the chip U2, the pin 10 of the chip U1 is connected to the pin 6 of the chip U2, the pin 12 of the chip U1 is connected to the positive electrode of the diode D4, the pin 13 of the chip U1 serves as a power supply control input pin, the pin 14 of the chip U1 is connected to the positive electrode of the diode D1, the pin 15 and pin 16 of the chip U1 are clock pins for online programming of the MCU for serial communication, the pin 17 of the chip U1 is connected to one end of the capacitor C1 and grounded, the other end of the capacitor C1 is connected to the pin 18 of the chip U1 and the negative electrode of the diode D6 together and connected to the power supply VCC, the positive electrode of the diode D6 is connected to the positive electrode of a 1632 button battery (i.e., the power supply), the negative electrode of the 1632 button battery is grounded, and the pin 19 of the chip U1 is connected to the positive electrode of the diode D7.

When receiving the target light rays, the light sensor 3 senses light rays reflected in for a plurality of times in front, and transmits the brightness data of the target light rays to the MCU (that is, the processing unit 4), the MCU adjusts the brightness of the LED according to the brightness data, specifically, adjusting the brightness of the LED through the LED drive circuit, in general, the brightness of the LED is positively correlated with the brightness of the target light rays.

With the adoption of the technical solution, the light source may adjust the brightness level automatically according to change of ambient light rays, so as to provide better visual experience. In an environment with dim light rays, the brightness may be reduced to reduce the power consumption of the light source; in a bright environment, the brightness may be increased to increase the visibility and clarity of the sighting point. The brightness of the LED is matched with ambient light, for example, external ambient light is very strong, the LED automatically increases the current and increases the brightness, so that a user may see more clearly, when the ambient light is very weak, the LED reduces the brightness, so that the brightness of the LED is compatible with the environment, observation is facilitated, and meanwhile, electricity quantity is saved.

Embodiment 1

Embodiment 1 differs in structural improvement of the reflecting lens 2.

As shown in FIG. 2, the reflecting lens 2 includes a first reflector 21 and a second reflector 22, the first reflector 21 and the second reflector 22 are sequentially disposed from front to back (namely, the direction from a target to human eyes, from left to right in FIG. 2), the first reflector 21 and the second reflector 22 are glued and fixed through a gluing layer 23, the light sensor 3 is located at the bottom of the inner side of the lens frame 11, the light sensor 3 is embedded in the sight body 1, and the receiving end of the light sensor 3 is located on the lower surface of first reflector 21.

With the design structure of double reflectors, the reflection optical path of the target light rays is carried out in the first reflector 21, and the reflection optical path of the LED is carried out in the second reflector 22, to avoid mutual influence of the two optical paths.

Figure 4:
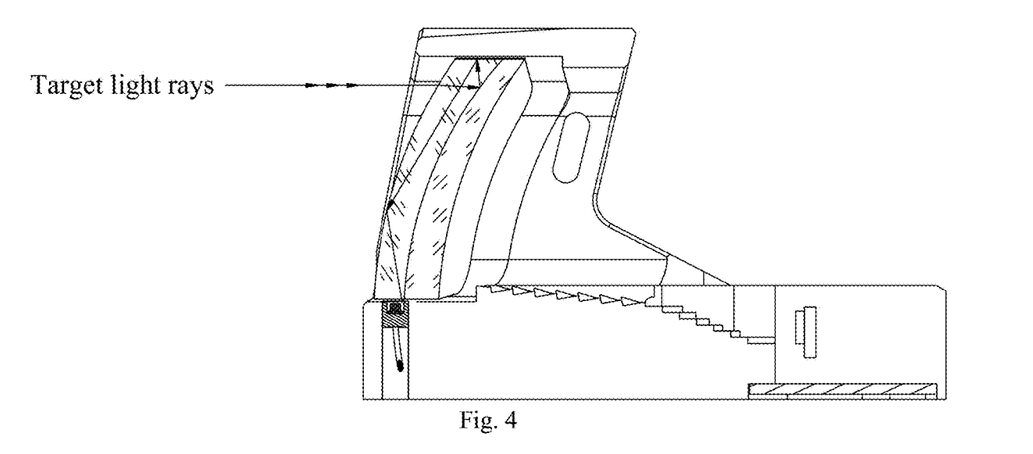
FIG. 4 is an optical path diagram of action of a light sensor.

As shown in FIG. 4, the target light rays are emitted to the rear surface of the first reflector 21 after once refraction after being emitted to the first reflector 21, then reflected to the upper surface of the first reflector 21 after reflection, and then emitted to the front surface of the first reflector 21 after reflection, in such a case, the incidence angle is greater than the critical angle, and the light rays are fully reflected to the lower surface of the first reflector 21, that is, the receiving end of the light sensor 3.

The reflection of the target light rays on the rear surface of the first reflector 21 includes the following.

(1) Part of the target light rays emitted into the first reflector 21 is reflected to the upper surface of the first reflector 21, and the other part of the target light rays is refracted into the second reflector 22.

(2) In the target light rays emitted into the first reflector 21, the target light rays located at the upper part of the first reflector 21 are totally reflected to the upper surface of the first reflector 21, and the condition of the target light rays located in the middle and lower part of the first reflector 21 are similar to (1), and meanwhile, along with downward movement of the position of the target light rays, the proportion of reflection to refraction gradually decreases.

Figure 5:
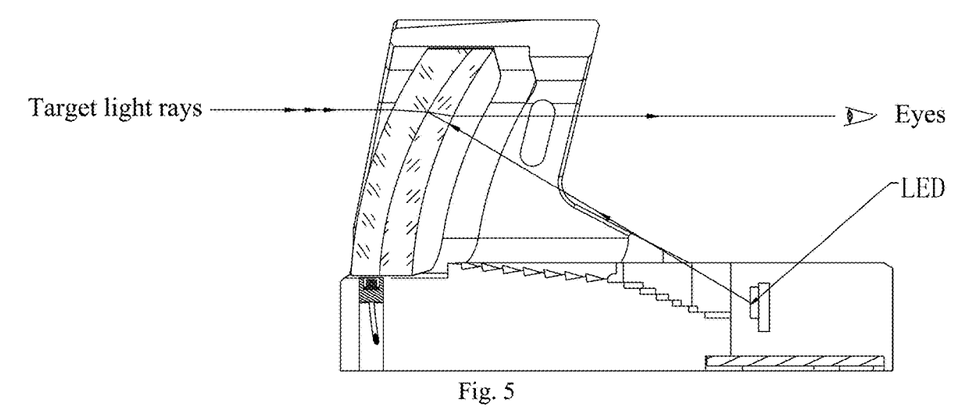
FIG. 5 is a reflection optical path diagram of an LED.

FIG. 5 is a reflection optical path diagram of the light source LED.

Preferably, the upper surfaces of the first reflector 21 and the second reflector 22 are electroplated, that is, a lens electroplating layer 24 is disposed on the tops of the first reflector 21 and the second reflector 22 to increase the reflection efficiency of light rays at the top of the lens.

Embodiment 2

Embodiment 2 differs in improvement of an installation structure of a light sensor 3.

The light sensor 3 is embedded in the sight body 1 (namely, the bottom of the inner side of the lens frame 11), an accommodating groove 12 is formed at the bottom of the inner side of the lens frame 11, an insulated fixed base 31 is deposed in the accommodating groove 12, and the light sensor 3 is disposed in the insulated fixed base 31.

By adoption of the technical solution, the light sensor 3 is installed in the accommodating groove 12 through the insulated fixed base 31, when the reflecting lens 2 is assembled, the light sensor 3 and the reflecting lens 2 are installed and glued together, thus eliminating redundant installation steps are saved, and cost is saved.

As shown in FIG. 3, preferably, the processing unit 4 is disposed at the bottom of the sight body 1, a channel communicating the accommodating groove 12 and the processing unit 4 is formed in the sight body 1, and a signal line connecting the light sensor 3 and the processing unit 4 is disposed in the channel.

The above are examples of the optimal implementation modes of the application, and the parts not described in detail are common knowledge those of ordinary skill in the art. The protection scope of the application shall be subject to the content the claims, and equivalent variations made based on the technical inspiration of the application shall fall within the protection scope of the application.

What is claimed is:

1. An automatic light-adjusting structure for a red dot sight, comprising a sight body, a lens frame disposed at an upper part of the sight body, a reflecting lens, a light sensor and a processing unit; wherein
   the reflecting lens is disposed in the lens frame;
   the light sensor is disposed at a bottom of an inner side of the lens frame, and located in the area, attaching to the lens frame, of the reflecting lens;
   the reflecting lens is configured for transmitting target light rays to a receiving end of the light sensor, and the light sensor is configured for detecting the brightness of the target light rays and transmitting brightness data to the processing unit; and
   the processing unit is configured for analyzing the brightness data and adjusting the brightness of a light source in the sight body according to an analysis result.

2. The automatic light-adjusting structure according to claim 1, wherein the reflecting lens comprises a first reflector and a second reflector which are sequentially disposed from front to back, and the first reflector and the second reflector are connected through a gluing layer.

3. The automatic light-adjusting structure according to claim 2, wherein a lens electroplated layer is disposed on the top of the first reflector.

4. The automatic light-adjusting structure according to claim 2, wherein the target light rays are sequentially emitted to the rear surface of the first reflector the upper surface of the first reflector, the front surface of the first reflector and a receiving end of the light sensor after emitted into the first reflector.

5. The automatic light-adjusting structure according to claim 1, wherein the light sensor is disposed in the lens frame in an embedding manner.

6. The automatic light-adjusting structure according to claim 5, wherein an accommodating groove is formed at the bottom of the inner side of the lens frame, an insulated fixed base is deposed in the accommodating groove, and the light sensor is disposed in the insulated fixed base.

7. The automatic light-adjusting structure according to claim 6, wherein the processing unit is disposed at the bottom of the sight body, a channel communicating the accommodating groove and the processing unit is formed in the sight body, and a signal line connecting the light sensor and the processing unit is disposed in the channel.

\* \* \* \* \*